United States Patent [19]  [11] 3,804,531
Kosaka et al.  [45] Apr. 16, 1974

[54] COLOR ANALYZER

[76] Inventors: Takeshi Kosaka, 239 Higashiasakayama-cho, 2-chome, Sakai, Osaka; Sanjiro Murakami, 3, Komagahagashi-cho, 4-chome, Nagata-ku, Kobe; Mikio Naya, 24, Yamamichi-cho, 2-chome, Toyakawa, Aichi, all of Japan

[22] Filed: Mar. 1, 1972

[21] Appl. No.: 230,725

Related U.S. Application Data

[63] Continuation-in-part of Ser. No. 764,081, Oct. 1, 1968, abandoned.

[30] Foreign Application Priority Data

| Oct. 2, 1967 | Japan | 42-83809 |
| Oct. 11, 1967 | Japan | 42-6527 |
| Jan. 17, 1968 | Japan | 43-278 |
| June 26, 1968 | Japan | 43-54102 |
| July 29, 1968 | Japan | 43-64948 |
| Aug. 14, 1968 | Japan | 43-69839 |
| Aug. 23, 1968 | Japan | 43-72947 |

[52] U.S. Cl............... 356/176, 356/177, 250/226, 178/5.6, 178/DIG. 4, 250/205
[51] Int. Cl............................................. G01j 3/50
[58] Field of Search ........... 356/173; 250/226, 205; 178/5.6, DIG. 4

[56] References Cited
UNITED STATES PATENTS
2,716,717   8/1955   Dresser........................... 250/226 X OTHER PUBLICATIONS
NHK Laboratories Note, Serial No. 137, December 1970: A Colorimetric Meas. Instrum. for TV Cameras, T. Saito, 15 pp.

Primary Examiner—Ronald L. Wibert
Assistant Examiner—R. J. Webster
Attorney, Agent, or Firm—Waters, Roditi, Schwartz & Nissen

[57] ABSTRACT

A color analyzer for measuring a color synthesized by the additive mixture of primary colors, each having an arbitrary but constant relative spectral energy distribution. The color analyzer has a light receiving portion consisting of three or more photoelectric transducer elements equal in number to said primary colors and having independent spectral sensitivities, so as to generate electric quantities representing the received optical energy levels, and an electric calculating circuit for generating electric outputs representing the energy levels of said primary colors individually, independently and simultaneously. The color analyzer can also measure the luminance of the light source, and display CIE chromaticity.

17 Claims, 22 Drawing Figures

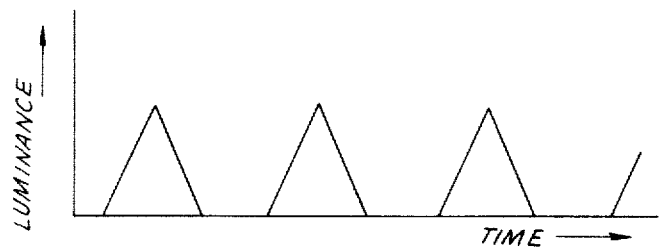
FIG. 16
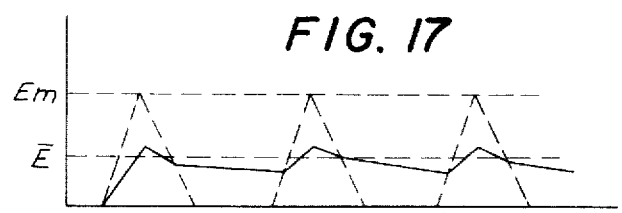
FIG. 17
FIG. 18
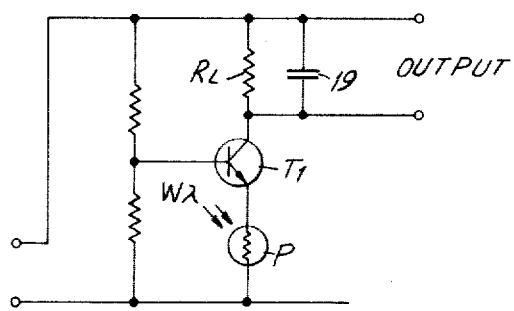

COLOR ANALYZER

OTHER APPLICATIONS

This application is a continuation-in-part of our earlier filed and copending application Ser. No. 764,081, filed Oct. 1, 1968, now abandoned.

FIELD OF INVENTION

This invention relates to color analyzers, and more particularly to a color analyzer which detects quantities of primary colors to produce a color by means of additive mixture.

BACKGROUND

Heretofore, several kinds of color analyzers have been proposed. According to one of these, firstly, spectral energies of a color to be analyzed are measured at various spectral wave lengths and then desired outputs are obtained through a complicated calculation by means of a computer to which the result of said measurement is applied. By using such apparatus, one may obtain accurate values for each of the colors, but such apparatus is too complicated in structure and too large in dimension to manufacture and use on a commercial basis. Further, this apparatus is not portable.

Furthermore, the conventional types of the known color analyzers are usually provided with three detectors including respectively a color filter and a photoelectric element which has such spectral characteristics as to satisfy the "Luther condition" approximately, outputs of said detectors being directly read by means of indicating means connected respectively with each of the detectors. Such conventional analyzers, however, can be utilized for measurement only of such colors as satisfy the Luther condition.

An analyzer not satisfying the Luther condition can measure quantities of primary colors in the color constituted by the additive mixture of the primary colors, if the correspondence between the spectral sensitivity of the detectors and the spectral distribution characteristics of the primary colors is effected. But it is very difficult to attain such correspondence. Furthermore, in such analyzer, it is impossible to detect independently the quantity of each of the primary colors, since the characteristic curves of the spectral distributions of the primary colors partially overlap each other.

Recently, it has been required to detect independently the quantity of the primary colors of composite color by means of such detectors as do not satisfy the Luther condition, in the field, for instance, of television broadcasting wherein the transmission system is adjusted by generating the chart image on the fluorescent screen of the monitor television so as to set thereon the reference white color, to measure the quantity of the three primary colors included in said chart image. As will be described hereinafter, three primary colors of a color emitted from the fluorescent screen of said color television partially overlap with their characteristic curves of the spectral distribution.

For avoiding undesirable effects from said overlapping, the quantity of the three primary colors of such color television has been measured, hitherto, in such a manner that each of the primary colors is generated independently on the fluorescent screen of the monitor television to measure the quantity thereof.

However, the quantity of each of these three primary colors measured with respect to composite color emitted from the television differs from that measured independently with respect to each of the primary colors, since the former quantity is affected by the electric and/or electromagnetic interference of the composite circuit.

SUMMARY OF INVENTION

A primary object of the present invention is, thus, to provide a compact and portable color analyzer which can detect independently the quantity of each of the primary colors of a color produced by the additive mixture thereof even if the detectors do not satisfy the Luther condition and also when the characteristic curves of spectral distribution of the primary colors partially overlap each other and are not in correspondence with the spectral sensitivity characteristics of the detectors.

In the color analyzer of the present invention, if photoconductive cells such as CdS cells, or photovoltaic cells such as silicon cells (namely SBC) are used as photoelectric elements in the detectors, this is better for compactness and portability of the device, since they are small and require less electric power.

Therefore, another object of the present invention is to provide a color analyzer using photoconductive cells or photovoltaic cells in the detectors as the photoelectric means.

It will be easily understood that, when the kinds of object to be measured are changed, the spectral distribution characteristics of its primary colors are changed in accordance therewith. Therefore, it is usually necessary to use for each one an expensive detecting device corresponding to each kind of object to be measured. A single detecting device has not heretofore been applicable to all of the kinds of objects to be measured without a troublesome adjustment of said device each time the object is changed.

Therefore, a further object of this invention is to provide a color analyzer wherein, when the kinds of object to be measured are changed, only a portion thereof is substituted for dealing with the change.

Furthermore, it is difficult for a device for generating reference colors to be always available to adjust the detecting device. For instance, when a device as in the present invention is applied for measurement of a colored light emitted from the fluorescent screen of a color television set, it is necessary for some particular device to be always available for generating the reference colors in the broadcasting station, and it is also necessary to control it so that the reference colors can always be generated whenever needed. It is, however, difficult to maintain such conditions. The same applies to the manufacturing steps relating to said device. Moreover, in the latter case, a particular device is required for each adjusting step.

A still further object of the invention is, therefore, to provide a color analyzer wherein memory circuits generate respectively an output identical with the detector outputs generated for reference colors and, when the device must be adjusted, said memory circuits can be connected in place of the detectors and, when the device is to be adjusted during manufacturing steps, said memory circuits can be substituted for the detectors.

Furthermore, color analyzers prior to the present invention, when applied for the measurement of an image on a fluorescent screen of the color television set, were not able to detect effectively the light energy of the image, since light emitted from the restricted portion of the fluorescent screen is intermittent.

A still further object of the invention is, therefore, to provide a color analyzer which detects effectively quantities of the primary colors even if a light to be measured is emitted intermittently.

BRIEF DESCRIPTION OF THE DRAWING

FIG. 16 is a graph showing the time variation characteristics of luminance of light issuing from a limited portion of a fluorescent screen of a color television tube;

FIG. 17 is a graph illustrating the output voltage characteristic of the unit detecting portion of FIG. 18 when a photometric system having the circuit of FIG. 18 measures luminance of light issuing from a limited portion of a fluorescent screen of a color television set;

FIG. 18 is a circuit diagram illustrating a modification of the circuit of FIG. 14, wherein a condenser is provided in parallel with a load resistor so that the output of the circuit becomes what is illustrated in FIG. 17;

DETAILED DESCRIPTION

It is known that a color constituted by an additive mixture of primary colors, such as the color of an image on the fluorescent screen of a color television, varies as the rate of energy levels or quantities of said primary colors. It is also known there is no variation in the spectral distribution of the relative radiant energy of each of the primary colors, and that there is only the increase and decrease of said energy levels or quantities when said energy levels or quantities are increased and decreased to obtain a desired color. For instance, in the three primaries which constitute the colors issuing from the fluorescent screen of a color television tube, the spectral distribution of the relative radiant energy of each of the primary colors does not vary irrespective of any variation of the mixed colors. In other words, when the maximum value of the relative radiant energy is assumed as 1 or 100, the distribution pattern of energy with respect to said maximum value does not vary, or has a normalized distribution characteristic irrespective of any variation of the mixed colors. Each spectral energy distribution of the primary colors which constitute a certain particular color can be represented as a product of said spectral distribution of the relative radiant energy (or a normalized spectral energy distribution) and the coefficient (zero or certain positive value) representing said energy level or quantity.

Figure 1:
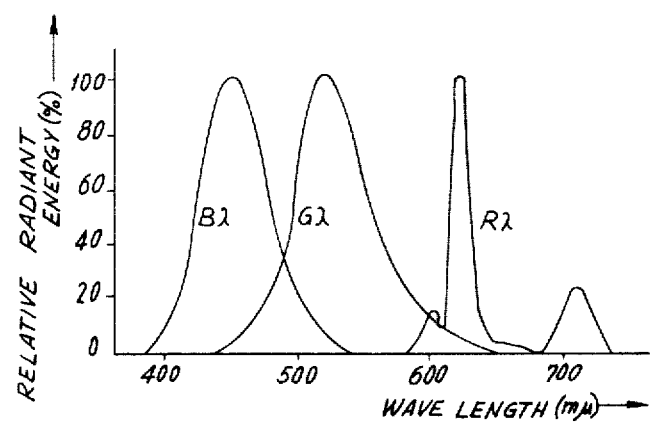
FIG. 1 is a graph illustrating an example of the relative spectral distribution of three primary colors of a colored light emitted from the fluorescent screen of a color television set.

Assuming that a color to be measured consists of three primary colors having spectral distributions of the relative radiant energies $B_\lambda$, $G_\lambda$ and $R_\lambda$ as shown in FIG. 1, and each coefficient of the energy levels of the primary colors for the color to be measured is $x_B$, $x_G$ and $x_R$, the spectral energy distribution $W_\lambda$ of the color is given by the following equation as a sum of each spectral energy distribution of the three primary colors.

$$W_\lambda = x_B B_\lambda + x_G G_\lambda + x_R R_\lambda \quad (1)$$

Figure 3:
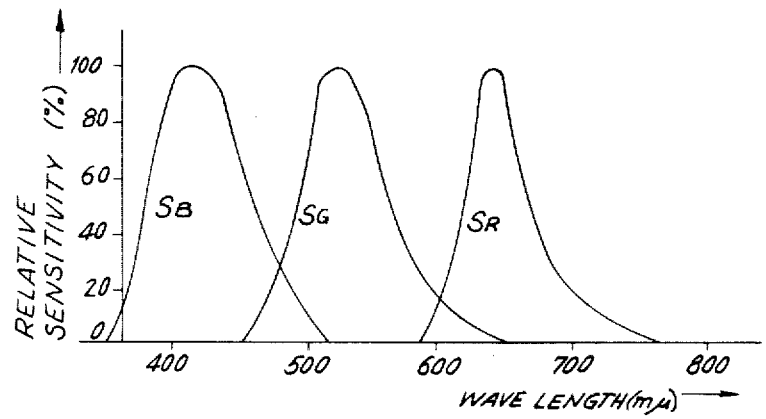
FIG. 3 is a graph showing an example of the spectral sensitivity of the detectors in a color analyzer of the type shown in FIG. 2.

When a color having the spectral energy distribution $W_\lambda$ shown in equation 1 is detected by three detectors having spectral sensitivities $S_B$, $S_G$ and $S_R$ respectively as shown in FIG. 3, the output $C_B$, $C_G$ and $C_R$ of the detectors can be given by the following equations.

$$C_B = \int_0^\infty W_\lambda \cdot S_B \cdot d\lambda \quad (2)$$

$$C_G = \int_0^\infty W_\lambda \cdot S_G \cdot d\lambda \quad (3)$$

$$C_R = \int_0^\infty W_\lambda \cdot S_R \cdot d\lambda \quad (4)$$

Figure 5:
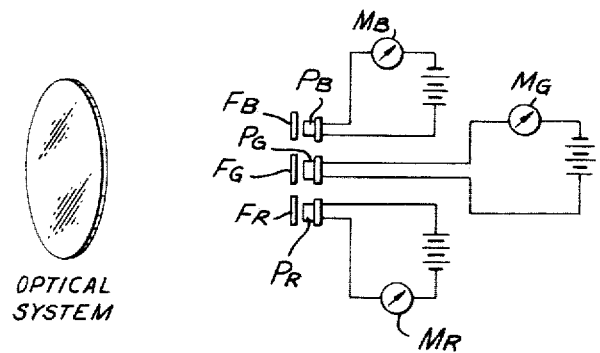
FIG. 5 is a schematic diagram of another optical system including three photoelectric elements.

In practice, the spectral sensitivities and outputs of the detectors can be obtained by an apparatus as shown in FIG. 5.

In the apparatus illustrated in FIG. 5, color input from the optical lens system is applied to three photoelectric elements $P_B$, $R_G$, and $P_R$, each having associated therewith a primary color filter $F_B$, $F_G$, or $F_R$, respectively. These filters and photoelectric elements cooperating therewith represent spectral sensitivities $S_B$, $S_G$, and $S_R$ in FIG. 3, or $S_W$, $S_Y$, and $S_O$ in FIG. 4.

Furthermore, each photoelectric element $P_B$, $P_G$, $P_R$ is connected to a corresponding indicating meter $M_B$, $M_G$ or $M_R$ through an electric circuit.

Figure 4:
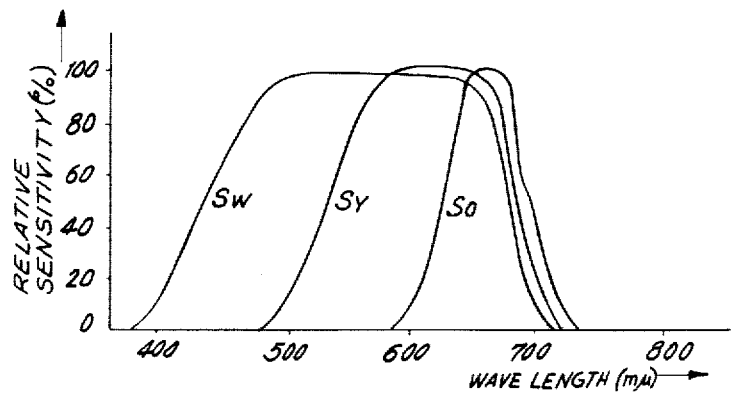
FIG. 4 is a chart illustrating spectral sensitivity.

By selection of the characteristics of the optical lens system 5, filters $F_B$, $F_G$ and $F_R$, the photoelectric elements $P_B$, $P_G$, $P_R$, the indicating meters $M_B$, $M_G$, $M_R$, and the electric circuits, the spectral sensitivity shown in FIG. 3 and FIG. 4 can be achieved with the apparatus of FIG. 5. Consequently, the outputs $C_B$, $C_G$ and $C_R$ read by the indicating meters $M_B$, $M_G$ and $M_R$, respectively, in response to a color having the aforesaid spectral energy distribution characteristics $W_\lambda$, satisfy the conditions of equations 2 to 4.

Here, if the spectral sensitivity is set in such manner as illustrated in FIG. 4, wherein the first curve $S_O$ corresponds, for instance, to the spectral energy distribution $R_\lambda$, the second curve $S_Y$ corresponds to the spectral energy $G_\lambda$ and extends over the spectral band of the first curve $S_O$, and the third curve $S_W$ in which three primary colors are involved, the energy introduced into the detectors having spectral sensitivities of $S_W$ and $S_Y$ will become larger than that of $S_B$ and $S_G$ in FIG. 3, so that amplified outputs can be obtained. This means that the detectors having spectral sensitivities as shown in FIG. 4 are suitable for the measurement of a color having weak energy.

Since the coefficients $x_B$, $x_G$ and $x_R$ are represented by zero or a positive number for showing the energy levels or quantities of the primary colors as set forth hereinbefore and are not dependent on the wave length $\lambda$, and since the spectral distributions of relative radiant energy $B_\lambda$, $G_\lambda$ and $R_\lambda$ and the spectral sensitivities $S_B$, $S_G$ and $S_R$ are functions of the wave length $\lambda$ as shown in FIGS. 1 and 3 by the curves varying in accordance with the wave length $\lambda$, the following equations can be derived by substituting equation 1 in equations 2 to 4.

$$C_B = x_B \int_0^\infty B_\lambda \cdot S_B \cdot d\lambda + x_G \int_0^\infty G_\lambda \cdot S_B \cdot d\lambda + x_R \int_0^\infty R_\lambda \cdot S_B \cdot d\lambda \quad (5)$$

$$C_G = x_B \int_0^\infty B_\lambda \cdot S_G \cdot d\lambda + x_G \int_0^\infty G_\lambda \cdot S_G \cdot d\lambda + x_R \int_0^\infty R_\lambda \cdot S_G \cdot d\lambda \quad (6)$$

$$C_R = x_B \int_0^\infty B_\lambda \cdot S_R \cdot d\lambda + x_G \int_0^\infty G_\lambda \cdot S_R \cdot d\lambda + x_R \int_0^\infty R_\lambda \cdot S_R \cdot d\lambda \quad (7)$$

If $$A_{11} = \int_0^\infty B_\lambda \cdot S_B \cdot d\lambda \quad A_{12} = \int_0^\infty G_\lambda \cdot S_B \cdot d\lambda$$

$$A_{13} = \int_0^\infty R_\lambda \cdot S_B \cdot d\lambda$$

$$A_{21} = \int_0^\infty B_\lambda \cdot S_G \cdot d\lambda \quad A_{22} = \int_0^\infty G_\lambda \cdot S_G \cdot d\lambda$$

$$A_{23} = \int_0^\infty R_\lambda \cdot S_G \cdot d\lambda \quad (8)$$

$$A_{31} = \int_0^\infty B_\lambda \cdot S_R \cdot d\lambda \quad A_{32} = \int_0^\infty G_\lambda \cdot S_R \cdot d\lambda$$

$$A_{33} = \int_0^\infty R_\lambda \cdot S_R \cdot d\lambda$$

the equations 5 to 7 can be simplified as follows:

$$C_B = A_{11} x_B + A_{12} x_G + A_{13} x_R \quad (9)$$

$$C_G = A_{21} x_B + A_{22} x_G + A_{23} x_R \quad (10)$$

$$C_R = A_{31} x_B + A_{32} x_G + A_{33} x_R \quad (11)$$

Herein, the spectral sensitivities $S_B$, $S_G$ and $S_R$ are always constant, and the spectral distribution of the relative radiant energies of the primary colors do not vary insofar as said each spectral distribution is that of the color issuing from the identical luminosity (which is, for instance, the fluorescent screen of a color television) as stated above. Therefore each integral term of equations 5, 6 and 7, that is $A_{ij}$ ($i=1-3$, $j=1-3$) in equations 9, 10 and 11, can be considered as the constant corresponding to said luminosity.

Thus, the output levels of the color analyzer $C_B$, $C_G$, $C_R$ can be given by the following matrix expression:

$$\begin{pmatrix} C_B \\ C_G \\ C_R \end{pmatrix} = \begin{pmatrix} A_{11} & A_{12} & A_{13} \\ A_{21} & A_{22} & A_{23} \\ A_{31} & A_{32} & A_{33} \end{pmatrix} \begin{pmatrix} x_B \\ x_G \\ x_R \end{pmatrix} \quad (12)$$

By taking an inverse, the primary color output levels $x_B$, $x_G$, and $x_R$ from a color television cathode ray tube can be expressed in the following manner:

$$\begin{pmatrix} x_B \\ x_G \\ x_R \end{pmatrix} = \begin{pmatrix} A_{11} & A_{12} & A_{13} \\ A_{21} & A_{22} & A_{23} \\ A_{31} & A_{32} & A_{33} \end{pmatrix}^{-1} \begin{pmatrix} C_B \\ C_G \\ C_R \end{pmatrix} \quad (13)$$

By expanding the matrix equation 13, the following equations are obtained:

$$x_B = D_{11} \cdot C_B + D_{12} \cdot C_G + D_{13} \cdot C_R \quad (14)$$

$$x_G = D_{21} \cdot C_B + D_{22} \cdot C_G + D_{23} \cdot C_R \quad (15)$$

$$x_R = D_{31} \cdot C_B + D_{32} \cdot C_G + D_{33} \cdot C_R \quad (16)$$

In equations 14, 15 and 16, the coefficients $D_{ij}$ ($i=1-3$, $j=1-3$) represent individual terms of the inverse matrix of the aforesaid matrix of the equation 13 having coefficients $A_{ij}$. For instance, the coefficient $D_{11}$ can be expressed in terms of $A_{ij}$ as follows:

$$D_{11} = \begin{vmatrix} A_{22} & A_{23} \\ A_{32} & A_{33} \end{vmatrix} / \begin{vmatrix} A_{11} & A_{12} & A_{13} \\ A_{21} & A_{22} & A_{23} \\ A_{31} & A_{32} & A_{33} \end{vmatrix} \quad (17)$$

In other words, $D_{11}$ is a function of $A_{ij}$ ($i=1-3, j=1-3$), and accordingly $D_{11}$ is a constant, because all of $A_{ij}$ are constants, as pointed out above. Similarly, it is easily seen that each of the coefficients $D_{ij}$ ($i=1-3, j=1-3$) is constant.

Therefore, provided that the denominator of the right side of equation 17 are known, the energy levels or quantities of the primary colors can be obtained from the outputs of the detectors by solving matrix equation 13, even if the spectral distributions of relative radiant energy of each of the primary colors overlap in part with each other and also the spectral distribution in each of the primary colors do not correspond with the spectral sensitivity of the detector.

The principles related to the CIE chromaticity indication in the color analyzer according to the present invention, will next be described. The spectral energy distribution $W_\lambda$, as defined in equation 1, can be rewritten as follows, according to the CIE method:

$$X = \int_0^\infty W_\lambda \cdot \bar{x}_\lambda d_\lambda \quad (18)$$

$$Y = \int_0^\infty W_\lambda \cdot \bar{y}_\lambda d_\lambda \quad (19)$$

$$Z = \int_0^\infty W_\lambda \cdot \bar{z}_\lambda d_\lambda \quad (20)$$

In equations 18 to 20 the term X, Y and Z represent tristimulus values of the CIE system with which any visible color can be specified in terms of the quantities of these stimuli and $\bar{x}$, $\bar{y}$ and $\bar{z}$ represent spectral tristimulus values of the CIE system and satisfy the so-called Luther Condition.

$$\bar{x} = X/(X + Y + Z) \quad (21)$$

$$\bar{y} = X/(X + Y + Z) \quad (22)$$

The CIE chromaticity indication can be achieved as follows. Since, as pointed out above, the quantity of the primary colors $x_B$, $x_G$, and $x_R$ are independent of the wave length, the following equations can be easily derived by substituting equation 1 in equations 18, 19 and 20:

$$X = x_B \int_0^\infty B_\lambda \cdot \bar{x} d_\lambda + x_G \int_0^\infty G_\lambda \cdot \bar{x} d_\lambda$$
$$+ x_R \int_0^\infty R_\lambda \cdot \bar{x} d_\lambda \quad (23)$$

$$Y = x_B \int_0^\infty B_\lambda \cdot \bar{y} d_\lambda + x_G \int_0^\infty G_\lambda \cdot \bar{y} d_\lambda$$
$$+ x_R \int_0^\infty R_\lambda \cdot \bar{y} d_\lambda \quad (24)$$

$$Z = x_B \int_0^\infty B_\lambda \cdot \bar{z} d_\lambda + x_G \int_0^\infty G_\lambda \cdot \bar{z} d_\lambda$$
$$+ x_R \int_0^\infty R_\lambda \cdot \bar{z} d_\lambda \quad (25)$$

In the equations 23 to 25, $B_\lambda$, $G_\lambda$ and $R_\lambda$ are spectral distributions of the relative radiant energy or normalized spectral energy distributions, and the spectral distributions of the spectral tristimulus values have fixed characteristics which have been determined by the CIE system, and integrals of them are constant. Accordingly, each integral term in the equations 23 to 25 is constant, and such equations can be simplified as follows:

$$X = C_{11} \cdot x_B + C_{12} \cdot x_G + C_{13} \cdot x_R \quad (26)$$

$$Y = C_{21} \cdot x_B + C_{22} \cdot x_G + C_{23} \cdot x_R \quad (27)$$

$$Z = C_{31} \cdot x_B + C_{32} \cdot x_G + C_{33} \cdot x_R \quad (28)$$

By substituting equations 14, 15 and 16 in the equation 26, one achieves:

$$X = (C_{11} \cdot D_{11} + C_{12} \cdot D_{21} + C_{13} \cdot D_{31}) \cdot C_B$$
$$+ (C_{11} \cdot D_{12} + C_{12} \cdot D_{22} + C_{13} \cdot D_{32}) \cdot C_G$$
$$+ (C_{11} \cdot D_{13} + C_{12} \cdot D_{23} + C_{13} \cdot D_{33}) \cdot C_R \quad (29)$$

In the equation 29, the coefficients of the term $C_B$, $C_G$ and $C_R$ are constant and, hence, it can be simplified into the following equation:

$$X = E_{11} \cdot C_B + E_{12} \cdot C_G + E_{13} \cdot C_R \quad (30)$$

Similarly, equations 27 and 29 can be rewritten as follows:

$$Y = E_{21} \cdot C_B + E_{22} \cdot C_G + E_{23} \cdot C_R \quad (31)$$

$$Z = E_{31} \cdot C_B + E_{32} \cdot C_G + E_{33} \cdot C_R \quad (32)$$

As described in the foregoing, the quantity of the primary colors of an arbitrary color from a television cathode ray tube can be detected by using the output levels $C_B$, $C_G$ and $C_R$ from a detector having different spectral sensitivities for each primary color, as shown by equations 14, 15 and 16. Furthermore, from the quantity of the primary colors $x_B$, $x_G$ and $x_R$, one can derive the quantities X, Y and Z of the CIE method, as shown by equations 26, 27 and 28. Of course, the quantities X, Y and Z can be directly derived from the primary color output levels $C_B$, $C_G$ and $C_R$, as shown by equations 30, 31 and 32. With the quantities X, Y and Z thus determined, the CIE chromaticity can be calculated by the equations 21 and 22.

Figure 2:
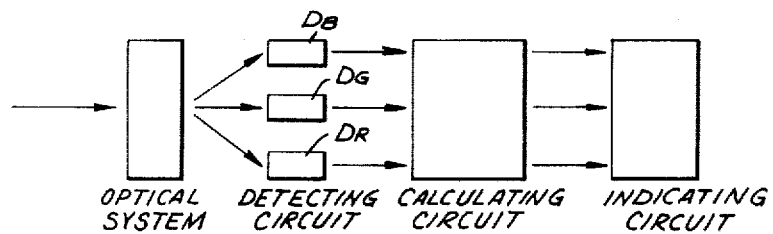
FIG. 2 is a block diagram illustrating the construction of the color analyzer in accordance with the present invention, wherein the parts other than the optical system are simplification of circuits as illustrated in FIGS. 6, 8, 10, 12, 15 and 20.

Thus, it will be understood that the quantities $x_B$, $x_G$ and $x_R$ of the primary colors can be obtained from the outputs $C_B$, $C_G$ and $C_R$ of the detectors by solving the equation 13 and the tristimulus values X, Y and Z of the CIE system can be independently obtained by solving the equations 26, 27 and 28. According to the invention, the matrix calculation is carried out by an electric circuit to obtain the quantities of the primary colors from the output of said electric circuit. In other words, in FIG. 2 showing the principle of the invention, the light to be measured is introduced through the optical system into the light receiving portion including a detecting means (Note- "detecting means" is used for indicating the circuit of FIG. 14, the circuits $D_B$, $D_G$, $D_R$ in FIGS. 6, 15 and 19, the circuit of FIG. 18 having a light receiving member such as photoconductive cells or photovoltaic cells, so that said detecting means issue photometric output signals $C_B$, $C_G$ and $C_R$ which correspond with each of the spectral sensitivities respectively. Then, said signals are introduced into the electric matrix circuit to carry out electrically therein a calculation of equation 13. The outputs of the electric matrix circuit are read by an indicating meter or the like.

Figure 6:
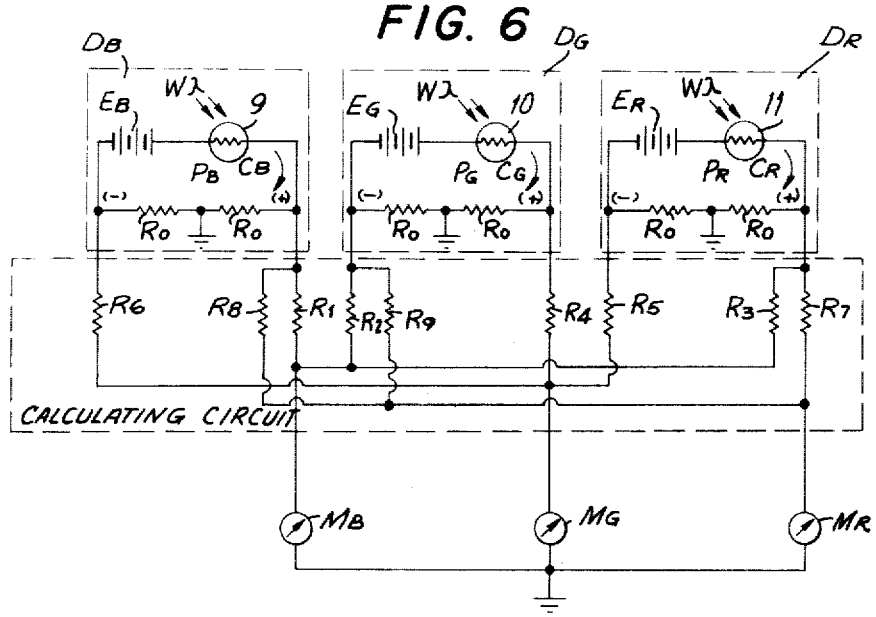
FIG. 6 is a schematic diagram of a fundamental circuit of a color analyzer of the present invention, wherein photoconductive cells are used.

FIG. 6 illustrates a fundamental circuit of the present invention, which includes cadmium sulfide (CdS) cells $P_B$, $P_G$ and $P_R$ as light receiving members before each of which a color filter is respectively disposed as shown in FIG. 5. It will next be explained how the calculation of equation 13 or equations 14, 15, 16 is carried out by the circuit of FIG. 6.

Upon the application of an arbitrary color, of which spectral energy distribution characteristics $W_\lambda$ are given by equation 1, each CdS cell produces an output current $C_B$, $C_G$, or $C_R$, depending on the spectral sensitivity $S_B$, $S_G$, or $S_R$, in the direction as depicted by the arrow in the figure. The outputs $C_B$, $C_G$ and $C_R$ satisfy the conditions of equations 2, 3 and 4. Each load resistor $R_o$ has a resistance value considerably smaller than that of each CdS cell. The junctions between each pair of series connected loading resistors $R_o$ are grounded. As the output current flows through the circuit comprising batteries $E_B$, $E_G$ and $E_R$, the CdS cell $P_B$, $P_G$ or $P_R$ and the two load resistors $R_o$, a positive voltage is produced at the junction between the detector and one load resistor $R_o$, as shown by the (+) mark, while a negative voltage is produced at the junction between the other load resistor $R_o$ and the batteries, as shown by the (−) mark. The magnitude of the voltages thus produced is proportional to the intensity of the output from the CdS cell. If the resistance values of resistors $R_i$ ($i$=1–9) are selected to be much larger than that of loading resistor $R_o$, the magnitude of the current through an indicating meter, for instance meter $M_B$, is given by the following equation:

$$I_B = (R_0/R_1) C_B - (R_0/R_2) C_G + (R_0/R_3) C_R \quad (33)$$

Similarly, the magnitude of the currents $I_G$, $I_R$ through other indicating meters $M_G$, $M_R$ can be expressed as follows:

$$I_C = (R_0/R_4) C_G - (R_0/R_5) C_R - (R_0/R_6) C_B \quad (34)$$

$$I_R = (R_0/R_7) C_R + (R_0/R_8) C_B - (R_0/R_9) C_G \quad (35)$$

In equations 33, 34 and 35, if the coefficients of the output currents $C_B$, $C_G$, $C_R$ are denoted by $G_{ij}$ ($i$=1–3, $j$=1–3), then those equations can be simplified as follows:

$$I_B = G_{11} C_B + G_{12} C_G + G_{13} C_R \quad (36)$$

$$I_G = G_{21} C_B + G_{22} C_G + G_{23} C_R \quad (37)$$

$$I_R = G_{31} C_B + G_{32} C_G + G_{33} C_R \quad (38)$$

In a comparison of equations 36, 37, 38 with the preceding equations 14, 15, 16, if the conditions of $$G_{ij} = D_{ij} \ (i=1-3, j=1-3) \quad (39)$$

are satisfied, then one obtains the relationships $I_B=x_B$, $I_G=x_G$, $I_R=x_R$.

The resistance values of the resistors $R_i$ ($i$=1–9) to fulfill the relations of equation 39 can be obtained through the following steps: firstly, the spectral distribution characteristics of the relative radiant energy $B_\lambda$, $G_\lambda$, $R_\lambda$ and spectral sensitivity characteristics of the detectors $S_B$, $S_G$, $S_R$ are determined by means of known devices; then these results are inserted into equation 8 so that $A_{ij}$ ($i$=1–3, $j$=1–3) are calculated; then $D_{ij}$ ($i$=1–3, $j$=1–3) are determined by calculating equation 17; then the values of $D_{ij}$ ($i$=1–3, $j$=1–3) obtained are inserted into the right side of equation 39 in the left side of which are substituted the fractions of $R_o$ and $R_i$ ($i$=1–9) as shown in equations 33, 34, 35 to solve equation 39.

Such steps are, however, complicated and troublesome, and therefore the resistance values of resistors $R_i$ ($i$=1–9) are obtained by conventional methods as described hereinafter. It will be noted that the following is a method for determining resistance values for the measurement of a white chart pattern appearing on the fluorescent screen of a color television tube. However, the method is also applicable for the measurements of other similar patterns and the like for other similar apparatus.

For determining said resistance, firstly, the white chart pattern is generated on the fluorescent screen of the color television which is left in its original condition (that is, the condition in which the input to the television set is not adjusted), and then a standard pattern having a standard white color which has a color temperature in the order of D6,500° or 9,300°C. + 27 MPCD is generated adjacent said white chart pattern. For instance, a thin light reflecting plate is arranged adjacent said chart pattern and is illuminated by a projector so as to generate said standard white color thereon. Then, the two adjacent patterns are compared with one another by the naked eye or by a suitable device to adjust the gain for each of the primary colors in the color television to match the color of the chart pattern with that of the standard pattern. After the matching operation, the device for generating the standard white color and including the thin plate and the projector is removed.

Then, the light receiving part of the color analyzer is set opposite the chart pattern of the adjusted fluorescent screen, and then there is performed an operation for generating one of the primary colors. Said operation is conducted by opening the circuits for generating the other two primary colors. Assuming that the firstly generated primary color is red, the color analyzer, which receives said red color only, is adjusted as to its values of the resistors $R_5$ and $R_3$ (FIG. 6) so that the meters $M_G$ and $M_R$ indicate zero on the scale. The green color is then generated on the chart pattern, and the values of the resistors $R_2$ and $R_9$ are adjusted so that the meters $M_B$ and $M_R$ indicate zero on the scale. Lastly, the blue color is generated on the chart pattern, and the values of the resistors $R_8$ and $R_6$ are adjusted so that the meters $M_R$ and $M_G$ indicate zero on the scale.

Next, the entire circuits for the three primary colors are closed for generating the standard white color on the chart pattern, and values of the resistors $R_1$, $R_4$ and $R_7$ are adjusted so that the meters $M_B$, $M_G$ and $M_R$ incidate respectively one on the scale (unit) with respect to said standard white color.

Thus, the resistance values of the resistors $R_i$ ($i$=1–9) are once adjusted. However, since the values of the resistors $R_1$, $R_4$ and $R_7$ are not adjusted sufficiently in a prior operation, when the meter of one of the primary colors indicates zero on the scale, the meters for other two primary colors do not indicate zero on the scale (for instance, the meters $M_B$ and $M_G$ do not indicate zero on the scale when the meter $M_R$ indicates zero).

Such unevenness is corrected by adjusting once more each of the resistors by generating each of the primary colors on the chart pattern in the order of red, green, and blue so that the values of the resistors $R_1$, $R_4$ and $R_7$ are adjusted once more whereafter each meter indicates one on the scale for the standard white color. Such correction can be repeated two or three times.

Here, if the spectral sensitivity of the detectors is selected as what is illustrated in FIG. 3, the deflection of the meter $M_B$ shall be effected mainly by the resistor $R1$, and the resistor $Rw$ and $Re$ serve only for a minor adjustment. This means that the resistance of the resistor $R1$ is set sufficiently smaller than that of the resistors $R2$ and $R3$. Similarly, the resistance of the resistors $R4$ and $R7$ are set sufficiently smaller than that of the other corresponding resistors. Thus the adjustment of the circuit is carried out primarily by the three resistors $R1$, $R4$ and $R7$.

The manner for determining exact values for the resistors is described in the above. When it is desired to know rough values for the resistors for judging an adjusting range thereof, a known circuit calculation can be used by measuring the values $C_B$, $C_G$, $C_R$ of the output current for the standard white color, determining the values of the output current required for oscillating the pointer of each of the meters over one unit of the scale (this can be done by utilizing a meter applicable in said values of the output current), and setting the value of $R_o$ to the proper one.

The color analyzer having the electric matrix circuit thus calibrated can adjust, for each of the primary colors, the gain of a color television set in a manner similar to that used in the calibration by generating the white chart pattern on the fluorescent screen, reading the meters $12_B$, $12_G$ and $12_R$ to determine aberrations of each of the values of the three primary colors which constitute said white color from the basic value (which is, for instance, represented by one on the scale of the meter), and adjusting each of the values of the three primary colors to agree with said basic value.

However, as can be seen from equation 8, the values of the term $A_{ij}$ ($i=1-3$, $j = 1-3$) vary depending on the spectral distribution characteristics of the fluorescent substances used for the primary colors in each color television cathode ray tube. In other words, the values of the terms $D_{ij}$ ($i=1-3$, $j=1-3$) also change with the aforesaid variation of the cathode ray tube characteristics, as seen from equations 14, 15 and 16. In fact, after carrying out a number of tests on various kinds of color television sets, it has been determined that there are considerable differences in primary color spectral characteristics among different fluorescent substances. One calibration as mentioned above is sufficient for one type of color television receiving set, but if it is desired to measure the primary color radiant energy levels of a plurality of different types of color television receiving sets, said calibration should be made each time the kind of fluorescent screen to be measured is changed. According to tests which have been carried out for calibration, it is necessary to prepare a particular color television set which is adapted to radiate reference or standard colors and, for measurement of various kinds of color television sets, each television set requires a standard color radiating device having same characteristics as those of such television set.

Figure 7:
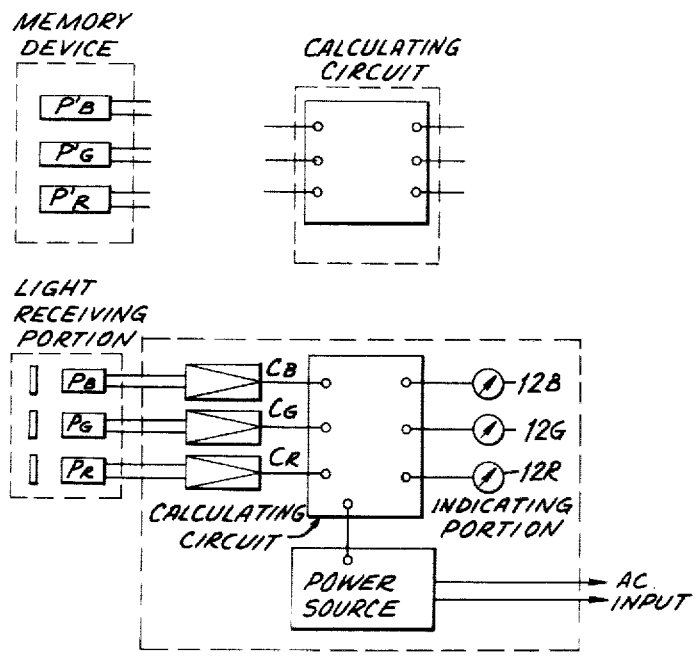
FIG. 7 is a block diagram illustrating an exchangeable calculating circuit and a memory device according to the present invention, which can be replaced for the corresponding portion in the circuits as shown in FIGS. 6, 8, 10, 12, 15 and 20.

In order to overcome such difficulties, another color analyzer according to the present invention, as shown in FIG. 7, uses calculating circuits or the matrix circuits are made in the form of interchangeable blocks to be detachably coupled to the main body of the analyzer, and a plurality of matrix circuits are provided which are selected in accordance with the subjects to be measured. Each of the aforesaid matrix circuits is pre-calibrated in the manner set forth above to match with different primary color spectral energy distribution characteristics of the fluorescent substance of various color television cathode ray tubes, so as to satisfy the conditions of equations 14, 15 and 16 for each cathode ray tube. With such pre-calibrated matrix circuits, measurement of colors emanating from different color television cathode ray tubes can be made simply by interchanging the matrix circuits for each cathode ray tube to be measured.

It should be noted that a plurality of such pre-calibrated matrix circuits can be mounted on a color analyzer of the present invention, in conjunction with a selection switch which can be mounted on the main body thereof, so that the same effect as said interchanging of the patchable matrix circuits can be achieved by turning the selective switch to connect in a desired matrix circuit. In FIG. 6, such matrix circuits are designated by being enclosed with dotted lines.

The memory device will next be described. As explained in the foregoing, without referring to any memory device, the color analyzer of the present invention can be calibrated by causing a color television cathode ray tube being measured to emanate one primary color light at a time and adjusting the calculating or matrix circuit of the analyzer to produce only those output levels corresponding to said emanated primary color at the final stage indicating meters thereof. For instance, referring to equations 9, 10 and 11, if only a quantity of the primary color $x_B$ is produced, the quantity of each primary colors can be given by $x_B=1$, $x_G=x_R=0$.

By substituting such relationship in equations 9, 10 and 11, the output levels from each detector or light receiving portion are given by $$C_B=A_{11}, \quad C_G=A_{21}, \quad C_R=A_{31} \tag{40}$$

Similarly, when only one unit primary color output level $x_G$ or $x_R$ is radiated from the cathode ray tube being measured, the corresponding output levels from the detectors will be $A_{12}$, $A_{22}$, $A_{32}$, or $A_{13}$, $A_{23}$, $A_{33}$ respectively. In actual calibration, for instance in the circuit of FIG. 6, as each unit primary color output emanates from the cathode ray tube being measured, electric currents equivalent to the aforesaid corresponding terms $A_{ij}(i = 1 \sim 3, j= 1 \sim 3)$ flow through each CdS cell circuit. Therefore, there are made preliminary arrangements of members, with respect to which outputs may regularly be generated corresponding to said $A_{ij}(i=1 \sim 3, j=1 \sim 3)$; that is, such members as are adapted for memorizing outputs of each of the light receiving members that are generated when said unit primary colors appear one by one on the fluorescent screen of the color television. Such members shall each hereinafter be referred as a memory member. Such memory member (which corresponds, for instance, with resistor groups in FIG. 9) has no output in and of itself, but output current flows therethough when the member is connected to a certain power source. Thus, the same effects of correction as in the case where the standard television is used can be achieved by substituting one after another the memory members respectively corresponding to $A_{i1}(i = 1 \sim 3) A_{i2}(i = 1 \sim 3)$ and $A_{i3}(i = 1 \sim 3)$ for the light receiving member, and generating outputs corresponding to $A_{ij}(i = 1 \sim 3, j = 1 \sim 3)$ from each of the detecting means. In this case, if the light receiving elements are, for instance, the photoconductive cells shown in FIG. 6, such resistors may be usable as the memory elements as having resistance values obtained by measuring the resistance values of each of the photoconductive cells as each of the primary color appears on the fluorescent screen when the calibration is, as mentioned above, done by generating the standard white color of color television on the fluorescent screen.

As shown in equation 8, the values of the constants $A_{ij}$ ($i=1-3, j=1-3$) depend both on the spectral energy distribution characteristics of each primary color in the light from the fluorescent screeen of the color television set to be measured and on the spectral sensitivity characteristics of the detectors and, accordingly, as the spectral energy distribution of the phosphor varies, the values of said constants also vary. In other words, with a plurality of memory devices in the present invention, which are present for each unit primary color spectral energy distribution of phosphors of different color television cathode ray tubes, the color analyzer of the present invention can be calibrated, without having the particular cathode ray tube to be measured, simply by substituting the thusly present memory devices for the light receiving members of the detecting means.

Figure 9:
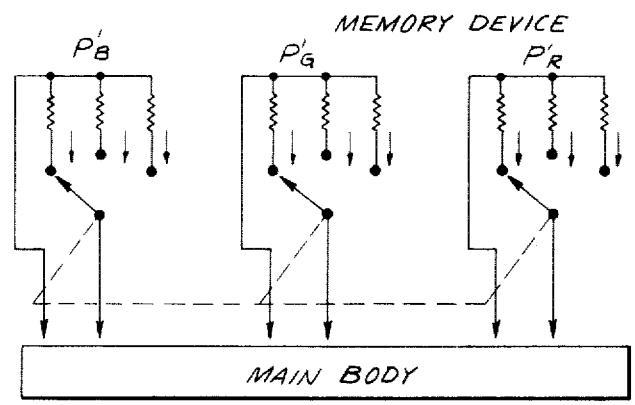
FIG. 9 is a detailed diagram of the memory device in FIG. 7.

FIG. 9 shows one such memory device for CdS cells. Herein, the resistance values of various resistors are so selected that upon proper actuation of the gang-operated change-over switches 13, 14 and 15, electric currents corresonding to the aforesaid constants $A_{ij}$ ($i=1-3, j=1-3$) flow through the respective circuits.

By providing a plurality of such memory devices mounted on the color analyzer, together with a proper selector switch means (not shown) to make proper selection of the memory devices for each cathode ray tube to be measured, the operation of interchanging the memory device for different cathode ray tubes can be dispensed with.

As pointed out in the foregoing, the memory device and the calculating circuit or matrix circuit correspond to the terms $A_{ij}$ ($i=-3, j=1-3$) as defined in equation 8 and to the terms $D_{ij}$ ($i=1-3, j=1-3$) as defined in equations 14, 15 and 16. Thus, the principles of such memory device and the calculating circuit can be used for the calculation of constants related to the CIE chromaticity, such as $C_{ij}$ ($i=1-3, j=1-3$) as defined in equations 26 and 28, as well as the terms $E_{ij}$ ($i=1-3, j=1-3$), as defined in equations 30, 31 and 32 (see FIGS. 10,12, 15 and 20).

Moreover, the unit quantity for the spectral energy distribution $W_\lambda$ of a color from the light source to be measured, as shown in equation 1, can be selected at any level at will, the values of the terms $A_{ij}$ ($i=1-3, j=1-3$), as defined in equation 8, depending on the unit color level. The values of $D_{ij}$ ($i=1-3, j=1-3$) also vary depending on $A_{ij}$ ($i=1-3, j=1-3$). In other words, the aforesaid memory device and the calculating circuit means can respond to any $A_{ij}$ ($i=1-3, j=1-3$) and $D_{ij}$ ($i=1-3, j=1-3$) and, accordingly, they can be used for storing and reproducing any color from a light to be measured. It is also possible to attach means for storing luminous energy to the aforesaid memory device, or to mount the aforesaid memory device directly on the main body of the color analyzer, for the sake of checking the calculating circuit. Similarly, checking of the light receiving portion, or detectors, can be facilitated by directly mounting both the aforesaid memory device and the calculating circuit on the main body of the color analyzer.

Figure 13:
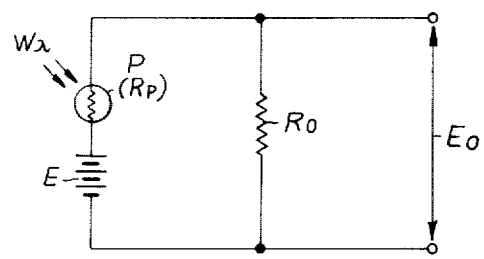
FIG. 13 is a simplified circuit diagram of a unit detecting portion in the embodiment shown in FIG. 6.

With reference to FIG. 13, showing the electric circuit related to a detector 9 of FIG. 6 while neglecting one of the loading resistors $R_o$, there is the following relationship between the output voltage $E_o$, the internal resistance $R_p$ of the photoelectric detector (e.g., detector 9) the power source voltage E, and the load resistance $R_o$:

$$E_o = [R_o/(R_p + R_o)] \cdot E$$

As seen, the output voltage $E_o$ is not exactly inversely proportional to the internal resistance of the detector 9. Thus, even when the gradient characteristics of the photoelectric element, or the so-called $\gamma$, is set at unity (1), the response of the output voltage to the incident light energy is not linear. This is a significant disadvantage of the circuit arrangement of FIG. 13. In the detector circuit mentioned above with reference to FIG. 6, the load resistance $R_o$ is selected to be negligibly small, compared with the internal resistance $R_p$ of the photoelectric element, and only that portion in which the resistance of the photoconductive cell is so high that the output of the detecting means is approximately proportional to the incident light energy has been used. Such usage of the photoelectric element is disadvantageous for the photoelectric element.

Figure 14:
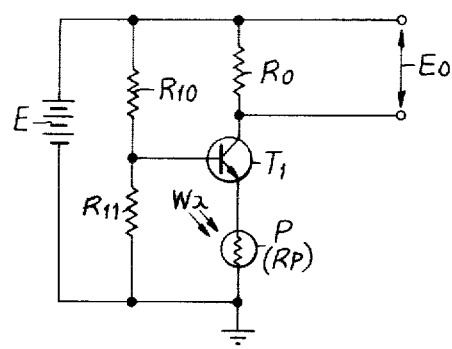
FIG. 14 is a circuit diagram showing a modification of the unit detecting portion in FIG. 13, wherein transistors are used.

On the other hand, in the embodiment shown in FIG. 14, if the resistances $R_{10}$ and $R_{11}$ are so chosen as to make the base current $i_B$ of transistor $T_1$ negligibly small compared with current $i_2$ through the resistance $R_{11}$, then there is the following relation between the voltage $E_2$ across the resistance $R_{11}$ and the power source voltage E:

$$E_2 = [R_{11}/(R_{10} + R_{11})] \cdot E$$

(41)

If the base-emitter voltage of the transistor $T_1$ is designated as $E_{BE}$ and the voltage across the photoelectric element P is represented as $E_p$, then the voltage $E_2$ across the resistance $R_{11}$ can be expressed as follows in terms of the two voltages:

$$E_2 = E_{BE} + E_p$$

(42)

The base-emitter voltage of a transistor is in the order of about 0.3 V for germanium transistors and about 0.6 V for silicon transistors and, hence, if the voltage $E_p$ across the photoelectric element P is selected to be sufficiently large and in excess of 0.6 V, the equation 42 can be simplified as follows:

$$E_2 = E_p \qquad (43)$$

By substituting 41 for 43:
$$E_p = [R_{11}/(R_{10} + R_{11})] \cdot E \qquad (44)$$

It is apparent from equation 44 that the voltage $E_p$ across the photoelectric element P is independent of the internal resistance $R_p$ thereof but depends on the values of $R_{10}$, $R_{11}$ and E. The current $i_p$ through the photoelectric element P is given by $$i_p = E_p/R_p = (1/R_p) \cdot [R_{11}/(R_{10} + R_{11})] \cdot E \quad (45)$$

As is well known, there are the following relationships between emitter current $i_p$, the base current $i_B$, and the collector current $i_c$ of the transistor $T_1$.

$$i_p = i_B + i_c \quad (46)$$

$$i_c = \rho \cdot i_B$$

Since P, the current amplification factor, is large, $i_B$ is negligibly small compared with $i_c$. Thus, equation 46 can be further simplified as follows:

$$i_p \approx i_c \quad (47)$$

Accordingly, the output voltage $E_o$ of the circuit of FIG. 14 can be expressed as $$E_o = i_p \cdot R_o = i_c \cdot R_o \quad (48)$$

By substituting 45 in 48:

$$E_o = [R_{11} \cdot R_o/(R_{10} + \overline{R}_{11})] \cdot (E/R_p) \quad (49)$$

Since the resistances $R_o$, $R_{10}$ and $R_{11}$ are all constants, equation 49 can be simplified to $$E_o = (K/R_p) \cdot E \quad (50)$$

wherein:

$$K = [R_{11} \cdot R_o/(R_{10} + R_{11})]$$

Thus, the current $i_p$ through the photoelectric element P depends only on the internal resistance $R_p$ thereof, and the influence of the load resistance $R_o$ on the linearity between the current $i_p$ and the output voltage $E_o$ is negligible. The output voltage $E_o$ of the circuit of FIG. 14 is inversely proportional to the internal resistance $R_p$ of the photoelectric element P.

Therefore, if a photoelectric element, having a characteristic such that a ratio ($\gamma$) of the intensity of the incident light to the resistance characteristic is one, is utilized, an output current in proportion to the intensity of the energy of the light impinging on the photoelectric element is impressed across the resistor $R_o$ irrespective the resistance value of the load resistance $R_o$. If the resistance value of said load resistance $R_o$ is varied, only the constant of proportion in said proportional relation varies.

Figure 15:
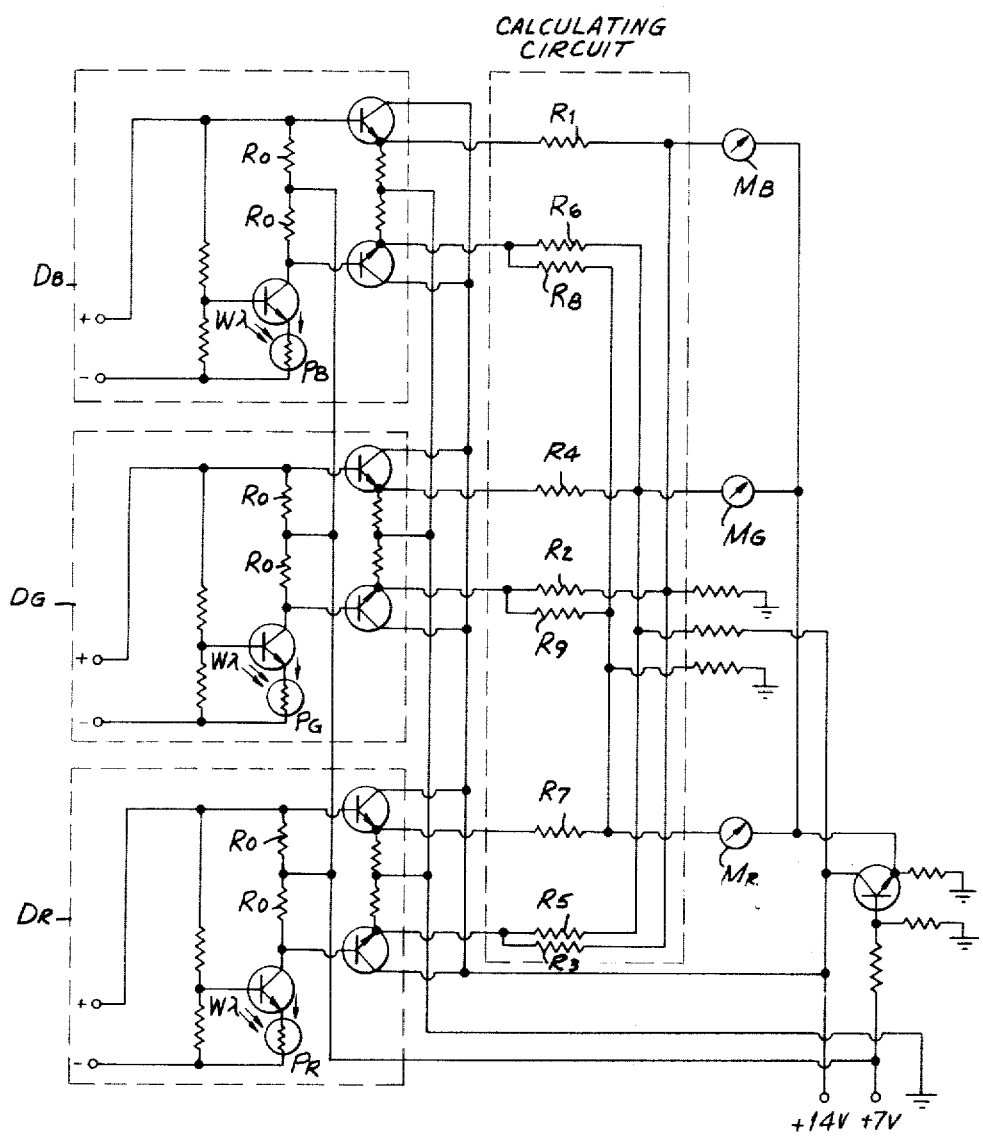
FIG. 15 is a circuit diagram of another embodiment of the analyzer including unit detecting portions of the construction shown in FIG. 14.

FIG. 15 shows the circuit diagram of an embodiment of the present invention, which incorporates the circuit of FIG. 2, together with calculating circuit and indicating meters $M_B$, $M_G$, and $M_R$ similar to those of the preceding embodiments.

As well known in the art, in any television receiving sets currently available, received images are visualized by scanning the screen of a cathode ray tube with electron beams. Accordingly, each spot of the cathode ray tube screen has a luminance varying as shown in FIG. 16, despite the fact that the screen may appaer to have a constant luminance to human visual acuity. In the known color measuring apparatus for setting standard colors of color television receiving sets, the luminance of each spot of the cathode ray tube screen is converted into photoelectric currents by three different detectors to produce corresponding output voltages by means of three output circuits (to be referred to as a "unit output portion" hereinafter), each having a circuit construction as shown in FIG. 14 (see also FIG. 15). If unit output portions having quick response characteristics, such as photoelectric elements with small time constants, are used in order to detect quick changes in the color being measured, then the output voltage characteristic of such unit output portions in response to the aforesaid spot luminance of the cathode ray tube screen is as shown in dotted lines in FIG. 17. The pointer of an indicating meter of the color measuring instrument shows the average value $\overline{E}$ of the illustrated output voltage. Compared with the thusly indicated average voltage $\overline{E}$, the actual maximum voltage of the output is considerably higher. If it is desired to produce a larger swing of the pointer of the indicating meter for showing such maximum voltage, a higher power source voltage is necessary together with an increased collector-emitter voltage and an increased base voltage for each transistor $T_1$, which results in raised ratings for the voltage and current capacity of various parts of the apparatus. With such raised voltage and current ratings of various parts, the efficiency of the apparatus is decreased, at least with respect to the values indicated by the apparatus. Thus, known color measuring apparatuses have various disadvantages.

Said disadvantage can effectively be overcome by an improved color analyzer in which capacitors are incorporated into each unit output portion in parallel with a loading resistor to improve the output voltage characteristics thereof.

Figure 19:
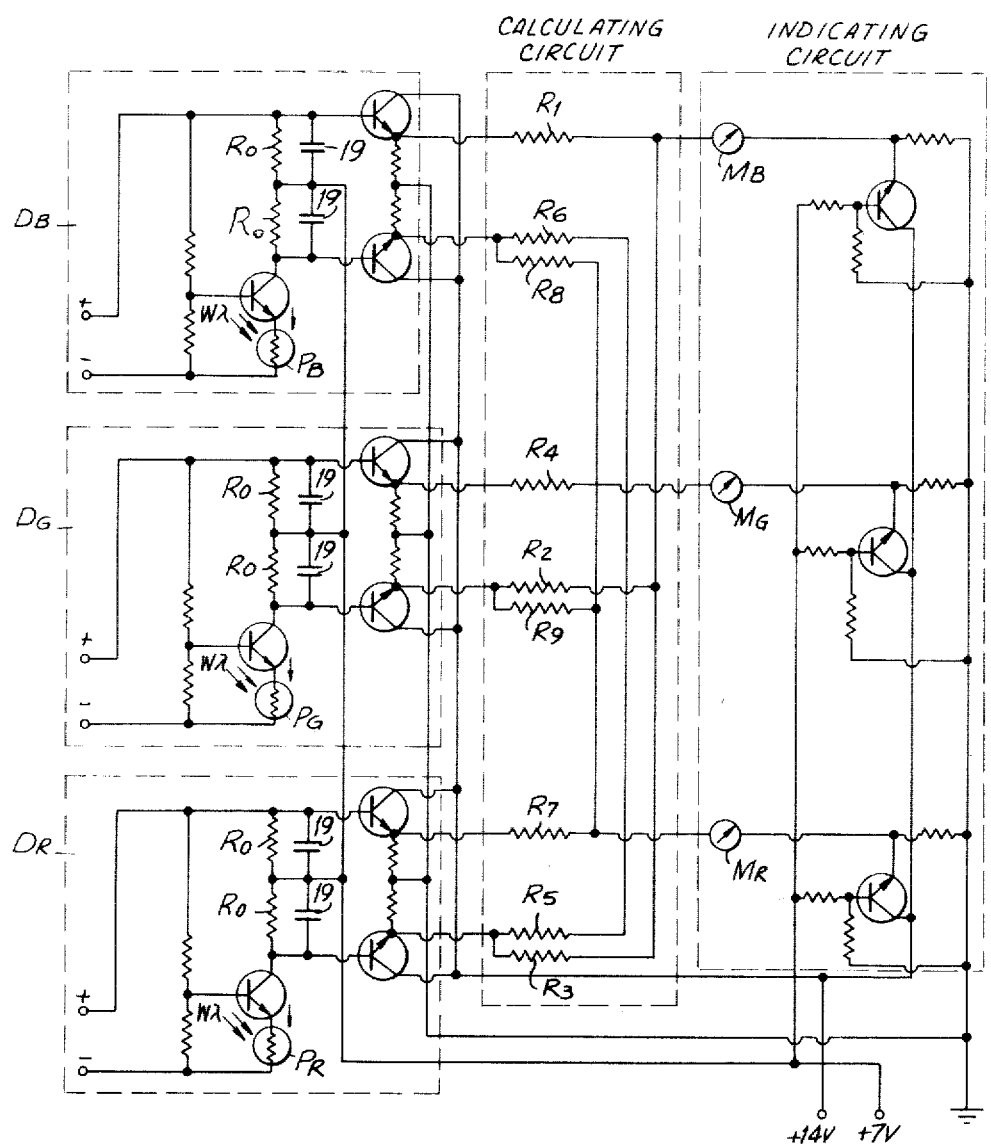
FIG. 19 is a circuit diagram of another embodiment formed by modifying the circuit of FIG. 15 and having the circuit of FIG. 18.

FIG. 19 shows a thusly modified unit output portion, usable in the color analyzer of the present invention. A transistor $T_1$ is connected to a photoelectric element P at the emitter thereof and to a load resistor $R_L$ at the collector thereof, and a capacitor 19 is connected in parallel to the load resistor $R_L$, with such construction of the unit output portion, the output voltage characteristics become as shown in solid lines in FIG. 17. This solid line characteristic has substantially the same average value as that of the dotted line for known color measuring apparatus, but the difference between the maximum value and the average value of the solid line characteristic is greatly reduced compared with that of the dotted line.

FIG. 19 shows a circuit diagram of another color analyzer according to the present invention, which uses the unit output portions shown in FIG. 18, as well as calculating circuits and indicating circuits. In this arrangement, the aforesaid disadvantages of known color measuring apparatus are overcome.

Figure 8:
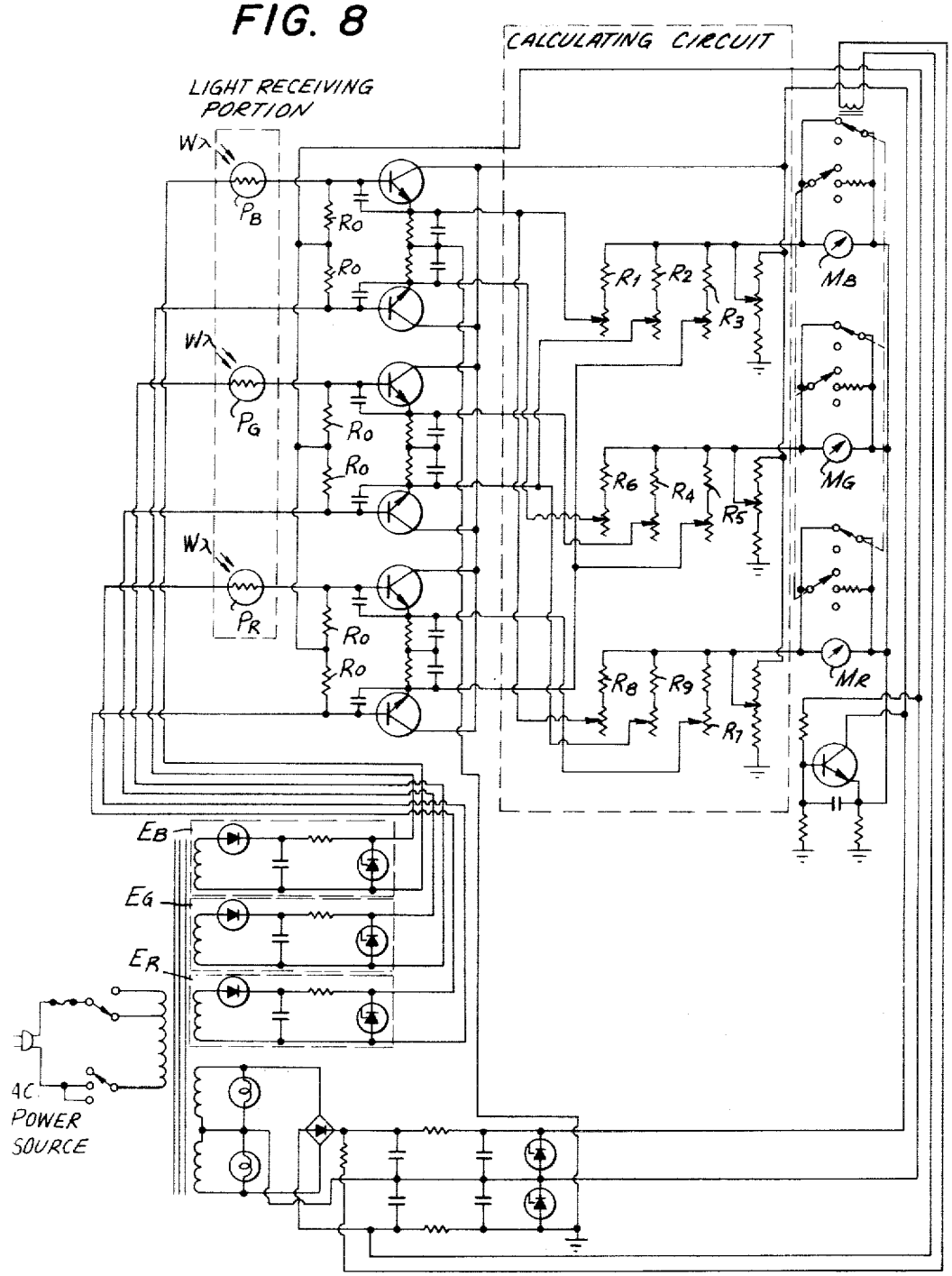
FIG. 8 is an embodiment of the circuit shown in FIG. 6.
Figure 12:
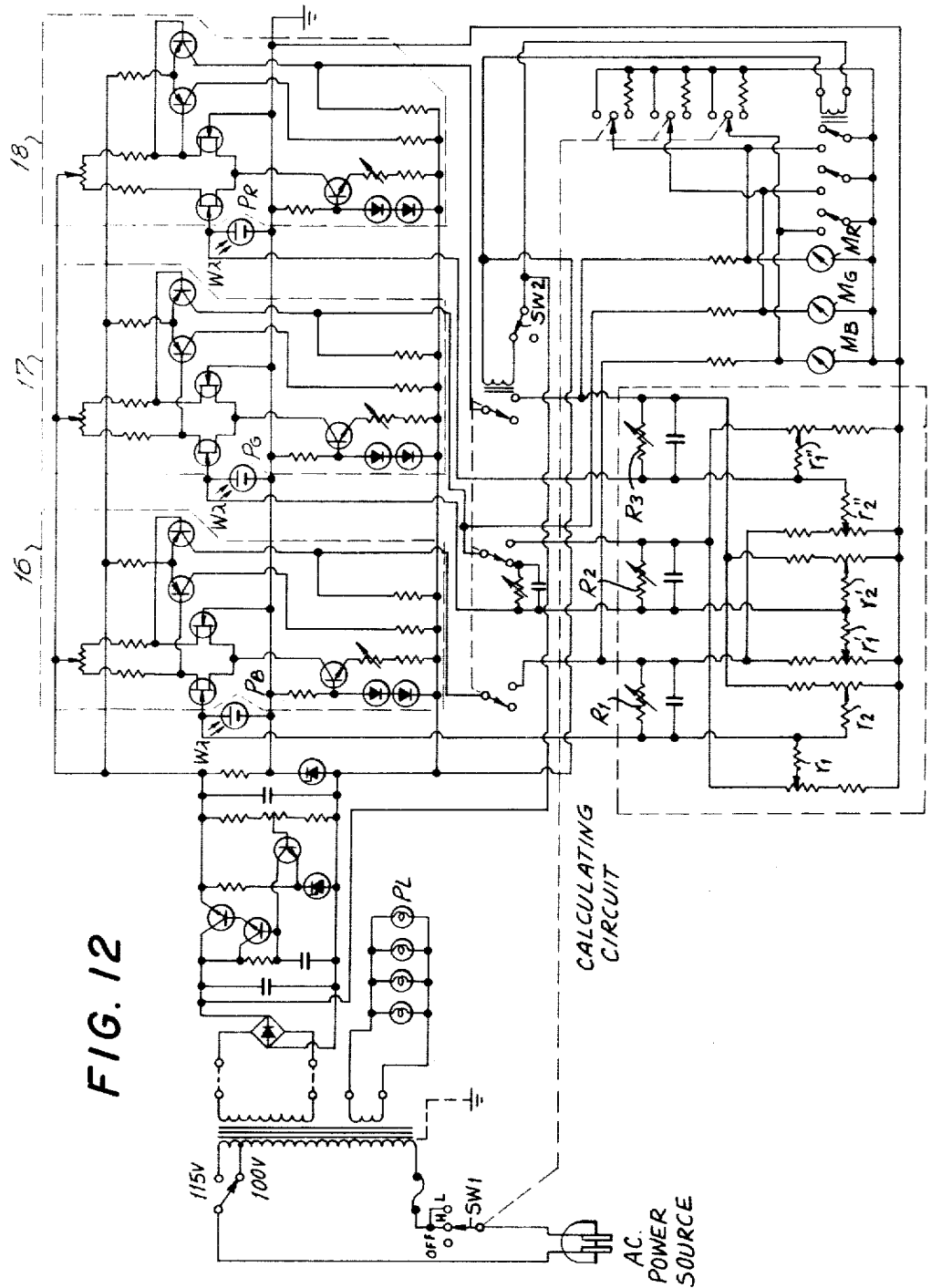
FIG. 12 is an embodiment of the circuit in FIG. 10.

It should be noticed here that any of the preceding embodiments of the present invention e.g., those illustrated in FIGs. 8 and 12, have capacities for the purpose as mentioned in the above.

In applying the color analyzer of the present invention, if the energy of the light source to be measured is low, and accordingly the output levels $C_B$, $C_G$ and $C_R$ of the color analyzer as defined in equations 2, 3 and 4 are small, it is possible to raise the output levels $C_B$, $C_G$ and $C_R$ from each detector of the color analyzer by, for instance, modifying the sensitivity region $S_B$ of FIG. 3 to cover all the primary unit levels $B_\lambda$, $C_\lambda$ and $R_\lambda$ of the light source being measured by using a filter or the like, while modifying the sensitivity region $S_G$ to cover $G_\lambda$ and $R_\lambda$, with the sensitivity region $S_R$ to cover $R_\lambda$ alone. Thereby, the construction of each element of the aforesaid calculating circuit, or matrix circuit, is made simpler, and the final output indicating the quantity of the primary colors $x_B$, $x_G$ and $x_R$ from the light source can be achieved.

On the contrary, if the light intensity of the light source to be measured is relatively high to produce high output levels $C_B$, $C_G$ and $C_R$ from the color analyzer of the invention, the individual primary color portions of the spectral sensitivity of the color analyzer can be so modified as to avoid mutual interference between them. For instance, the sensitivity region $S_B$ of the spectral sensitivity of the detector, as shown in FIG. 3, covers only one primary unit output $B_\lambda$ from the light source being measured by means of a filter or the like and, similarly, the sensitivity regions $S_G$ and $S_R$ cover the primary unit outputs $G_\lambda$ and $R_\lambda$. Thereby, the value of the terms $D_{ij}$ ($i=1-3$, $j=1-3$) as defined in equations 14, 15 and 16, can be minimized so that the construction of each element of the aforesaid calculating circuit is made simpler, and the final output from the color analyzer, which represents the quantity of the primary colors $x_B$, $x_G$ and $x_R$ from the light source being measured, can be generated.

Figure 11:
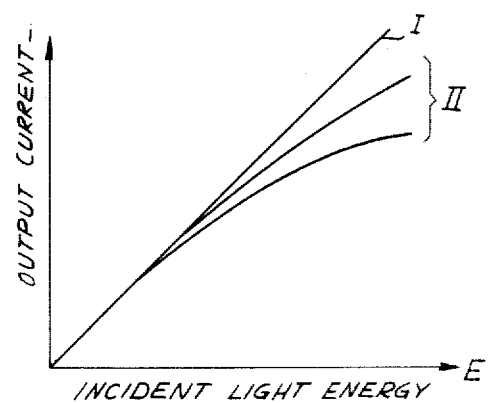
FIG. 11 is a characteristics diagram of the photovoltaic elements in the color analyzer of FIG. 10.
Figure 10:
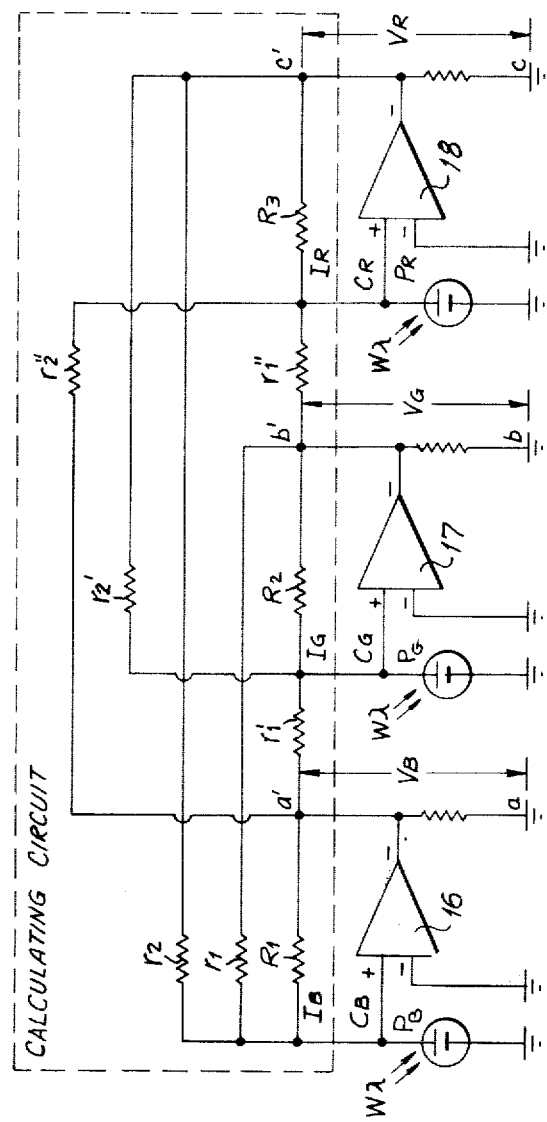
FIG. 10 is a schematic diagram of another fundamental circuit of a color analyzer of the present invention, wherein photovoltaic cells are used.

FIG. 10 shows another circuit of the present invention, based on equations 14 to 16. In this figure, each detector comprises a silicon blue cell (SBC) element, and each such element has linear light-current characteristics under short circuit conditions, as depicted by the straight line I in FIG. 11. In other words, if the output current from such detector element and the amount of the incident light are represented by $i$ and $E$, respectively, then there is the relation of $i=K \cdot E$, $K$ being a constant peculiar to each element. When the element is loaded, its light-current characteristics becomes $i=K \cdot E^\epsilon$, $\epsilon$ being a variable depending on the intensity of the incident light and the loading impedance. Such loaded characteristics of the element are shown by curves II in FIG. 11. In this embodiment, it is intended to use output currents proportional to the intensity of the incident light and, hence, the load impedance to each element is adjusted to be zero in the fundamental circuit, as depicted in FIG. 10. For example, in the case of the detector $P_B$, one terminal of the element $P_B$ is connected with one input terminal of the differential amplifier 16, and the output voltage from the differential amplifier is fed back to said input terminal thereof through a feedback resistance $R_1$ to make the equivalent load impedance of the element $P_B$ zero. Here, the equivalent input impedance of the differential amplifier is selected to be infinity, e.g. by using field effect transistors (FET) and, hence, the two end terminals of the detector element are at the same potential. Similarly, the equivalent loading impedances for the detector elements $P_G$, $P_R$ are made zero by means of feedback resistors $R_2$, $R_3$ across the differential amplifiers 17, 18.

In FIG. 10, points $a'$, $b'$ and $c'$ are generally at different potentials. More particularly, the potentials at the points $a'$, $b'$ and $c'$ depend respectively on the magnitudes of the current passing through the feedback resistors $R_1$, $R_2$ and $R_3$. On the other hand, the potentials at the points $a$, $b$ and $c$ are similar to one another, since the potentials at the two end terminals of the detector are the same. Consequently, the voltage impressed across the resistance $r_1$ is equal to the potential at the point $b'$, and the other resistance $r_2$, $r_1'$, $r_1''$ are similarly impressed with a voltage which is the same as the potential at the points $c'$, $a'$ or $b'$. When a color having the spectral energy distribution characteristics $W_\lambda$, as defined in equation 1, is applied to the detector elements $P_B$, $P_G$, and $P_R$, they produce output currents $C_B$, $C_G$ and $C_R$ as defined by equations 2, 3 and 4. The output currents flow through resistors $R_i$ ($i=1-3$) $r_i$ ($i=1-2$), $r_i'$ ($i=1-2$) and $r_i''$ ($i=1-2$). If the currents through the resistors $R_1$, $R_2$ and $R_3$ are represented by $I_B$, $I_G$ and $I_R$ respectively, then $I_B$ can be given by the following equations:

$$I_B = C_B - (R_2/r_1) \cdot I_G - (R_3/r_2) \cdot I_R \quad (51)$$

In equation 51, the second term represents the current through the resistor $r_1$, and the third term represents the current through the resistor $r_2$.

Similarly, the currents $I_G$ and $I_R$ are given by $$I_G = C_G - (R_1/r_1') \cdot I_B - (R_3/r_2') \cdot I_R \quad (52)$$

$$I_R = C_R - (R_2/r_1'') \cdot I_G - (R_1/r_2'') \cdot I_B \quad (53)$$

By eliminating $I_G$ and $I_R$ from equations 51, 52 and 53

$$I_B = \alpha \cdot C_B + \beta \cdot C_G + \gamma \cdot C_R \quad (54)$$

Here $$\alpha = 1/R_1 \begin{vmatrix} 1/R_2 & 1/r_2' \\ 1/r_1'' & 1/R_3 \end{vmatrix} \Bigg/ \begin{vmatrix} 1/R_1 & 1/r_1 & 1/r_2 \\ 1/r_1' & 1/R_2 & 1/r_2' \\ 1/r_2'' & 1/r_1'' & 1/R_3 \end{vmatrix}$$

$$\beta = 1/R_1 \begin{vmatrix} 1/r_1'' & 1/R_3 \\ 1/r_1 & 1/r_2' \end{vmatrix} \Bigg/ \begin{vmatrix} 1/R_1 & 1/r_1 & 1/r_2 \\ 1/r_1' & 1/R_2 & 1/r_2' \\ 1/r_2'' & 1/r_1'' & 1/R_3 \end{vmatrix}$$

$$\gamma = 1/R_1 \begin{vmatrix} 1/r_1 & 1/r_2 \\ 1/R_2 & 1/r_2' \end{vmatrix} \Bigg/ \begin{vmatrix} 1/R_1 & 1/r_1 & 1/r_2 \\ 1/r_1' & 1/R_2 & 1/r_2' \\ 1/r_2'' & 1/r_1'' & 1/R_3 \end{vmatrix}$$

By using simplified notation for the coefficients of $C_B$, $C_G$ and $C_R$ in equation 54, one achieves:

$$I_B = g_1 \cdot C_B + g_2 \cdot C_G + g_3 \cdot C_R$$

Thus, the voltage $V_B$ across the points $a$ and $a'$ in FIG. 10 is given by $$V_B = R_1 \cdot I_B$$
$$= R_1 g_1 \cdot C_B + R_1 g_2 \cdot C_G + R_1 g_3 \cdot C_R$$

If the coefficients of the output currents $C_B$, $C_G$ and $C_R$ are substituted, the following relationship can be derived:

$$V_B = G_{11} \cdot C_B + G_{12} \cdot C_G + G_{13} \cdot C_R \quad (55)$$

Similarly, the voltage $V_G$ across the points $b$, $b'$ and voltage $V_R$ across the points $c$, $c'$ are as follows:

$$V_G = G_{21} \cdot C_B + G_{22} \cdot C_G + G_{23} \cdot C_R \quad (56)$$

$$V_R = G_{31} \cdot C_B + G_{32} \cdot C_G + G_{33} \cdot C_R \quad (57)$$

The coefficients $G_{ij}$ ($i=1-3$, $j=1-3$) in equations 55, 56 and 57 are combinations of various resistances, as described above. In comparing the voltages $V_B$, $V_G$ and $V_R$ of equations 55, 56 and 57 against the quantity of the primary colors $x_B$, $x_G$ and $x_R$ of equations 14, 15 and 16, the conditions for equating each of said voltages to the corresponding one of said quantities are as follows:

$$G_{ij} \ (i=1-3, j=1-3) = D_{ij} \ (i=1-3, j=1-3) \quad (58)$$

In other words, by proper selection of the resistance values of various resistors, the quantity of the primary colors $x_B$, $x_G$ and $x_R$ from each color television cathode ray tube can be expressed by the voltages $V_B$, $V_G$ and $V_R$. Here, the resistance values can be obtained in a manner similar to that explained with reference to FIG. 6.

In the case of the aforesaid SBC detector circuit, it is also possible to make the calculating circuit interchangeable, as in the case of CdS circuits. More particularly, the calculating circuit enclosed by dotted lines in FIG. 10 can be made in the form of a patchable board or the like. The detectors can be also interchangeably replaced with a memory device having the constants $A_{ij}$ ($i=1-3$, $j=1-3$), stored therein as defined by equation 8. It should be noted that the memory device for the SBC detectors is different from that for the CdS cell in that the resistors shown in the memory device of FIG. 9 are replaced with certain constant-current generating means satisfying the conditions of equations 8 defining the constants $A_{ij}$ ($i=1-3$, $j=1-3$). The calculating circuits and the memory device can be modified to best suit the SBC detector circuit, as in the case of the CdS circuit.

FIG. 12 shows an embodiment incorporating the principles described and illustrated hereinbefore, referring to FIG. 10. The apparatus or color analyzer according to the present invention can also indicate CIE chromaticity as next described. As shown in equations 26, 27 and 28, the quantities X, Y and Z can be calculated from the quantity of the primary colors $x_B$, $x_G$ and $x_R$, and the comparison of equations 26, 27, 28 with equations 14, 15, 16 shows that those two groups of equations have the same mathematical construction.

Equations 26, 27, 28 are represented by the following matrix expression:

$$\begin{pmatrix} X \\ Y \\ Z \end{pmatrix} = \begin{pmatrix} C_{11} & C_{12} & C_{13} \\ C_{21} & C_{22} & C_{23} \\ C_{31} & C_{32} & C_{33} \end{pmatrix} \begin{pmatrix} x_R \\ x_G \\ x_B \end{pmatrix}$$

Consequently, with circuit means similar to the aforesaid matrix circuit or calculating circuit, the values of X, Y and Z can be determined, for instance, by connecting an assembly of a load resistance and a second calculating circuit similar to that shown in FIG. 6 with the output terminals of said circuits of the color analyzer so that the output currents $x_B$, $x_G$ and $x_R$ of said circuits may run through the load resistances of said assembly. In this case, circuit constants of the second calculation circuit can be obtained through the following steps substantially similar to those as mentioned above with reference to the circuit of FIG. 6.

Generally, makers of color televisions have advised users of the CIE chromaticity indication of each of the primary colors of television sets, said primary colors having been obtained when a reference white is constituted by an additive mixture of the primary colors which constitute colors of the light issuing from the fluorescent screen of the cathode ray tube of the color television set. In this case, we regard the CIE chromaticity indication of a certain color television set to be measured as $X_r$, $Y_r$, $Z_r$ with regard to the red primary color, $X_g$, $Y_g$, $Z_g$ to the green primary color, and $X_b$, $Y_b$ and $Z_b$ to the blue primary color.

Here, assuming that only the red primary color is generated on the chart pattern of the fluorescent screen of the color television set to be measured, as indicated above, only the value of the $x_R$ changes to value $x_{RU}$ to oscillate the pointer of the indicating member by a unit range, and the others become zero. Therefore, said matrix expression can be given as follows:

$$\begin{pmatrix} X_r \\ Y_r \\ Z_r \end{pmatrix} = \begin{pmatrix} C_{11} & C_{12} & C_{13} \\ C_{21} & C_{22} & C_{23} \\ C_{31} & C_{32} & C_{33} \end{pmatrix} \begin{pmatrix} 0 \\ 0 \\ x_{RU} \end{pmatrix}$$

By expanding said matrix expression, one obtains the following equations:

$X_r = C_{13} x_{RU}$
$Y_r = C_{23} x_{RU}$
$Z_r = C_{33} x_{RU}$

In these equations, the values of $X_r$, $Y_r$, $Z_r$ are known factors, and the $x_{RU}$ is the output of the first matrix circuit. Therefore, circuit constants corresponding to the $C_{13}$, $C_{23}$, $C_{33}$ are to be set under the condition that the outputs of the second matrix circuit take values of $X_r$, $Y_r$, $Z_r$. Said setting is carried out, for instance, by observing an indicating member provided at the output of the second matrix circuit. Said circuit constants are obtained, as explained with reference to FIG. 6, by setting the values of circuit elements which give the $G_{i3}$ ($i=1-3$) of equations 36, 37 and 38 and correspond to the resistors $R_3$, $R_5$ and $R_7$ in FIG. 6. Similarly, for obtaining other circuit constants of the second matrix circuit, only the green primary color is then generated on the chart pattern of said fluorescent screen, and values of the circuit elements corresponding to the resistors $R_2$, $R_4$, $R_9$ in FIG. 6 are determined so that the outputs of the second matrix circuit correspond with the $X_g$, $Y_g$, $Z_g$. Then only the blue primary color is generated and values of the circuit elements corresponding to the resistors $R_1$, $R_6$, $R_8$ are determined so that said outputs correspond with the $X_g$, $Y_g$, $Z_g$.

Once the quantities X, Y and Z are determined, the CIE chromaticity $(x, y)$ can be calculated by performing a number of additions and divisions, as specified in equations 21 and 22.

It is also apparent that the quantities X, Y and Z can be determined from the output levels $c_B$, $c_G$ and $c_R$ from the color analyzer according to the present invention, as shown by equations 30, 31 and 32. Similar matrix circuits can be used for determining the aforesaid quantities from the color analyzer output levels, as seen from comparison of equations 30, 31 and 32 with equations 14, 15 and 16. Here, the circuit constants of this matrix circuit can be obtained through the following steps. Namely, only the red primary color is generated on the fluorescent screen of the color television to which the light receiving member of the color analyzer is opposite, and values of circuit elements (that is, for instance, values of the circuit elements corresponding to the resistors $R_3$, $R_5$, $R_7$ in FIG. 6) corresponding to the constants $E_{i3}(i=1-3)$ are determined so that the outputs of the matrix circuit correpsond with the $X_r$, $Y_r$, $Z_r$. Then only the green primary color is generated and values of the circuit elements corresponding to the constants $E_{i2}$ ($i=1-3$) are determined so that said outputs correspond with the $X_g$, $Y_g$, $Z_g$. Lastly, only the blue primary color is generated and values of the circuit elements corresponding to the constants $E_{i1}$ ($i=1-3$) are determined so that said outputs correspond with the $X_b$, $Y_b$, $Z_b$. Such steps are repeated two or three times. Accordingly, the CIE chromaticity indication can be provided by carrying out the calculation of equations 21 and 22 through a suitable circuit of known type.

If it is desired to measure the luminance of the light source being measured, such measurement can be also carried out by slightly modifying the color analyzer of the present invention. For instance, in the circuit of FIG. 12, one of the spectral sensitivities of the detectors (FIG. 3) is so modified as to match with the specific luminosity $V_\lambda$ to be sufficiently close for practical applications, and suitable change switches (not shown) are incorporated in the circuit at each indicating meter (FIG. 7) to deliver the output level corresponding to the spectral sensi-tivity to a suitable luminance indicating means without passing through the aforesaid matrix circuit. Alternately, a separate detector having spectral output characteristics, which are sufficiently close to the desired specific luminosity $V_\lambda$ for practical purposes, can be mounted in the light receiving portion of the color analyzer, or a separate luminance indicating meter can be mounted thereon. In FIG. 12, a switch $SW_2$ is shown for selectively using the indicating meter $M_G$ as a luminance indicator as well as the primary color quantity indicator and, with the switch $SW_2$ positioned as shown in the figure, the meter $M_G$ is used as a luminance meter.

Furthermore, the color analyzer, according to the present invention, can be used as a photo detector in servo control systems. For instance, when it is desired to have a standard white in a white chart pattern which is generated on the fluorescent screen of the color television set, it is capable of automatically adjusting the gain for each of the primary colors of the color television set by a servo-system of which the input terminals are connected to the output terminals of the color analyzer of the present invention instead of connecting the indicating member thereto.

It is also possible within the scope of the present invention to add display lamps to the indicating meters to facilitate the inspection thereof, or to improve the accuracy of the meters by adding a suitable electric circuit, e.g. a circuit to double the pointer swing in conjunction with suitable selector switches, or magnifying lenses, etc.

Figure 20:
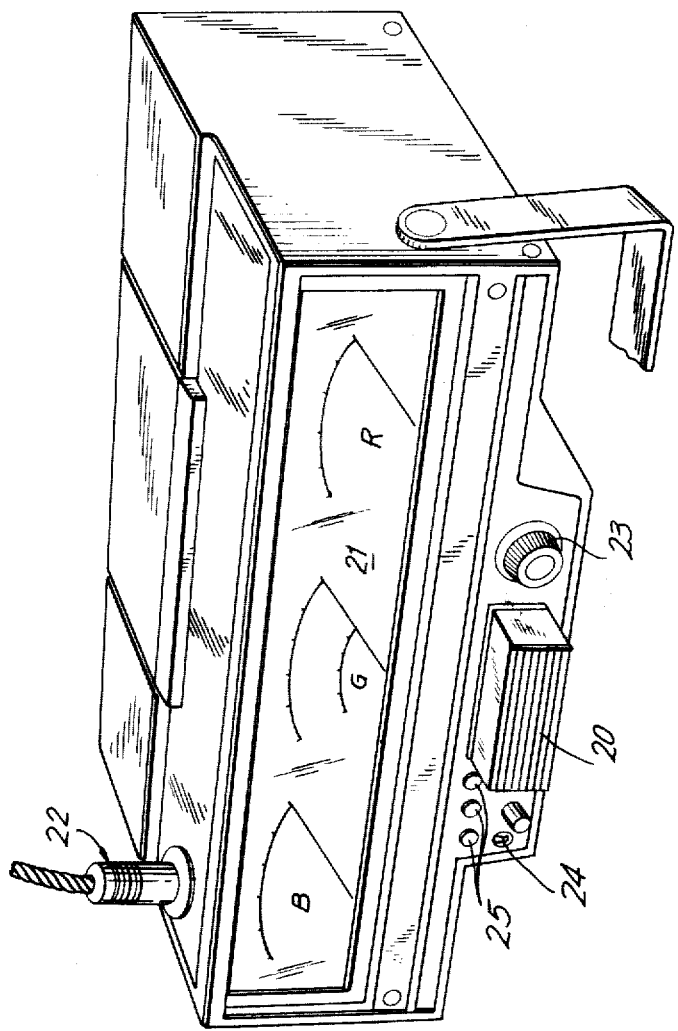
FIG. 20 is an exterior perspective view of the color analyzer, according to the present invention.

FIG. 20 is a perspective view of an embodiment of the color analyzer of the present invention, in which the reference numeral 20 designates a calculating circuit, 21 indicating meters, 22 a connector between a light receiving portion and the main body of the color analyzer, 23 a range selecting switch for selecting the accuracy level of the indicating meters, 24 a similar range selecting switch for the measurement of luminance, and 25 a knob for adjusting the zero point of the indicating meter pointers.

Figure 21:
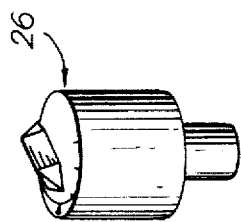
FIG. 21 is a perspective view showing the appearance of the memory device used in the color analyzer of FIG. 20.
Figure 22:
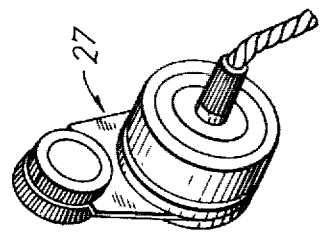
FIG. 22 is a perspective view of the light receiving portion of the color analyzer.

FIG. 21 and 22 show a memory device and a light receiving portion, respectively, of a completely fabricated embodiment of the present invention, illustrated in the perspective view.

It is apparent that the aforesaid embodiments are only by way of illustration, and various modifications can be made without departing from the scope of the present invention such as, for example, by adding an optical system or a filter means in front of the light receiving portion of the color analyzer, using, as detectors, photomultiplier, selenium, or PbS photoresistors, photodiodes, phototransistors, etc., using a constant-voltage generator for the elements of the memory device depending on the type of the detectors used in the light receiving portion of the color analyzer, carrying out the aforesaid calculation in digital fashion, forming at least a part of the aforesaid calculating circuit in the form of interchangeable boards to be selectively and detachably patched to the main body of the color analyzer, fabricating the aforesaid calculating circuit as a set of independent calculating parts each usable for a specific calculation for a type of light source and mounting such set of parts on the main body of the color analyzer together with a selective switch so as to select the most suitable calculating part for each light source being measured, using digital type indicating means, incorporating a circuit for compensating characteristics of the outputs of the detecting means to the spectral energy applied to the detecting means or amplifying circuit in the electric circuit of the color analyzer, and the like. In the illustrated embodiments, a D.C. power source consisting of batteries is used, but any other suitable power source of A.C. or D.C. type can be also used.

As described in detail in the foregoing, with the color analyzer of the present invention, individual primary color output levels of any light source constituted by the additive color mixture of primary colors having an arbitrary but fixed spectral distribution can be measured either individually or simultaneously. The color analyzer, according to the present invention, is also capable of measuring the luminous energy of the light source, setting the standard white of a monitor color television simply by regulating the individual primary colors based on the thusly measured output energy levels and the luminance, indicating the CIE chromaticity, storing colors by using a memory device, calibrating the color analyzer itself without using a light source to be measured, checking the calculating circuit, measuring individual primary color output levels from different kinds of light source with the aid of a calculating circuit but without necessitating calibrations thereof, setting any desired color based on the thusly measured output levels, setting the detectors by mounting said memory device and said calculating circuit on the main body of the color analyzer, and the like.

The color analyzer of the invention can also be used as an optical detecting means in a servo-system for automatic setting of an arbitrary color at the light source being measured.

The color analyzer of the present invention is further characterized in that it can be easily manufactured on an industrial mass production basis, and it can be fabricated in the form of light, handy portable device.

In the aforegoing as well as in the following claims the term "primary colors" is used to mean such colors as constitute colors in, for instance, a fluorescent screen of a color television set. These primary colors have such a nature that the relative spectral energy distribution characteristic thereof is always constant, whereas the output energy level thereof is varied, and that the variation of said output energy level of each of the primary colors results in formation of different colors in, for instance, said fluorescent screen.

The term "additive color mixture" is used to mean a mixture as defined in equation 1 and expresses a spectral distribution characteristic of a color obtained by the synthesis of spectral distribution characteristic curves of each of the primary colors.

What is claimed is:

1. A color analyzer for determining individual primary color output levels of any light source constituted by the additive color mixture of primary color stimuli having an arbitrary but fixed spectral distribution comprising:

at least three photodetector means responsive to different spectral portions of the light emitted by said source and for providing electric signals proportional to the light incident thereon, the spectral sensitivity of each photodetector means corresponding with the spectral distribution of a given additive primary color; an electric matrix circuit means responsive to the signals generated by the photodetector means for analyzing the information in said signals by solving the following equation:

$$\begin{pmatrix} x_b \\ x_G \\ x_R \end{pmatrix} = \begin{pmatrix} A_{11} & A_{12} & A_{13} \\ A_{21} & A_{22} & A_{23} \\ A_{31} & A_{32} & A_{33} \end{pmatrix}^{-1} \begin{pmatrix} C_B \\ C_G \\ C_R \end{pmatrix}$$

wherein $x_b$, $x_G$ and $x_R$ are the coefficients of the energy levels of the blue, green and red additive primary color stimuli respectively of the color to be measured, $C_B$, $C_G$ and $C_R$ are integral terms representing the color emitted by each additive primary color stimulus at a predetermined energy level represented by the aforementioned coefficients and as detected by each of said photodetector means with the aforementioned spectral sensitivities; and $A_{ij}$ ($i=1-3$, $j=1-3$) are the integral terms corresponding to the color emitted by each additive primary color stimulus regardless of the energy level but due to its fixed energy level distribution which is independent of energy level, and as detected by each of said photodetector means with the aforementioned spectral sensitivities; and indicator means connected to said matrix circuit means to indicate the energy level of a respective one of the additive primary color stimuli.

2. A color analyzer as claimed in claim 1 wherein:

$$\begin{pmatrix} X \\ Y \\ Z \end{pmatrix} = \begin{pmatrix} E_{11} & E_{12} & E_{13} \\ E_{21} & E_{22} & E_{23} \\ E_{31} & E_{32} & E_{33} \end{pmatrix} \begin{pmatrix} C_B \\ C_G \\ C_R \end{pmatrix}$$

wherein X, Y and Z are outputs of the matrix circuit means which correspond to C.I.E. tristimulus values of the color to be measured and $E_{ij}$ ($i=1-3, j=1-3$) where $C_{ij} D_{ij}$ ($i=1-3, j=1-3$) where $C_{ij}$ are integral terms representing the color emitted by each additive primary color stimulus as detected by each detector means with a fixed C.I.E. tristumulus spectral distribution sensitivity, and where $D_{ij}$ represent individual terms of the inverse matrix of the aforesaid matrix having coefficients $A_{ij}$.

3. A color analyzer as claimed in claim 1 wherein each photodetector means includes a photoelectric cell and a color filter for transmitting only light energy of a selected spectral band to the respective cell.

4. A color analyzer as claimed in claim 1 wherein said indicating means includes three indicators connected respectively with the outputs of the matrix circuit means.

5. A color analyzer as claimed in claim 1 comprising a servo-system and wherein the matrix circuit means includes outputs connected with said servo-system which adjusts automatically the quantity of each primary color.

6. A color analyzer as claimed in claim 1 wherein each photodetector means has a spectral sensitivity corresponding respectively to each of the spectral energy distributions of the primary colors and the adjacent characteristic curves of the spectral sensitivities slightly overlap each other.

7. A color analyzer as claimed in claim 1 wherein the matrix circuit means includes exchangeable circuits independent of one another and having different circuit constants.

8. A color analyzer as claimed in claim 7 wherein more than two matrix circuits are provided selectably corresponding to the characteristics of an object to be measured.

9. A color analyzer as claimed in claim 1 including memory members and wherein the photodetector means are exchangeable with the memory members to obtain electric signals corresponding to outputs of the photodetector means which receive a light of standard color.

10. A color analyzer as claimed in claim 9 further comprising more than one group of memory members which are exchangeable for the photodetector means.

11. A color analyzer as claimed in claim 1 wherein each photodetector means comprises a photoconductive cell, load resistances, and a transistor including an emitter connected with the photoconductive cell and a collector connected with the load resistances in series.

12. A color analyzer as claimed in claim 11 wherein each photodetector means includes two condensers connected respectively in parallel with one of the load resistances.

13. A color analyzer as claimed in claim 12 further comprising a plurality of condensers connected respectively in parallel with each load resistance.

14. A color analyzer as claimed in claim 1 wherein each photodetector means comprises a photovoltaic cell, a differential amplifier circuit, one terminal of the cell being connected with one input terminal of the amplifier circuit, and a feed-back resistance, the output terminal of the amplifier circuit being connected with said terminal fo the cell through the feedback resistance.

15. A color analyzer as claimed in claim 14 wherein the electric matrix circuit includes said feedback resistances and six further resistances.

16. A color analyzer as claimed in claim 15 wherein each amplifier circuit includes two field effect transistors.

17. A color analyzer as claimed in claim 16 further comprising three condensers connected respectively in parallel with said feedback resistance.

* * * * *

UNITED STATES PATENT OFFICE
CERTIFICATE OF CORRECTION

Patent No. 3,804,531  Dated April 16, 1974

Inventor(s) Takeshi Kosaka et al.

It is certified that error appears in the above-identified patent and that said Letters Patent are hereby corrected as shown below:

On the Cover Sheet, in item [30] the following should be added:

-- Oct. 11, 1967    Japan .............42-65271 --.

-- Jan. 17, 1968    Japan .............43-2787 --.

Signed and Sealed this second Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,804,531  Dated April 16, 1974

Inventor(s) Takeshi Kosaka et al.

It is certified that error appears in the above-identified patent and that said Letters Patent are hereby corrected as shown below:

On the cover sheet item 30, lines 2 and 3 should read

-- Oct. 11, 1967    Japan----------42-65271

Jan. 17, 1968    Japan----------43-2787    --.

This certificate supersedes Certificate of Correction issued September 2, 1975.

Signed and Sealed this

Twenty-first Day of September 1976

[SEAL]

Attest:

RUTH C. MASON
*Attesting Officer*

C. MARSHALL DANN
*Commissioner of Patents and Trademarks*